United States Patent [19]

Fletcher et al.

[11] 3,878,464

[45] Apr. 15, 1975

[54] MODULATOR FOR TONE AND BINARY SIGNALS

[76] Inventors: James C. Fletcher, Administrator of the National Aeronautics & Space Administration with respect to an invention of; James R. McChesney, Tonawanda; Theodore Lerner, Buffalo; Ernest J. Fitch, Eggertsville, all of N.Y.

[22] Filed: June 15, 1973

[21] Appl. No.: 370,271

[52] U.S. Cl. .................... 325/30; 178/66 R; 325/60

[51] Int. Cl. .......................... H04k 1/08; H04h 3/00

[58] Field of Search .................. 179/15 BL, 15 BM; 178/66 R, 66 A, 67; 325/30, 59, 60, 63

[56] References Cited

UNITED STATES PATENTS 3,289,082 11/1966 Shumate .............................. 325/30

3,454,904 7/1969 Clites et al. ....................... 178/66 R

*Primary Examiner*—Benedict V. Safourek

*Attorney, Agent, or Firm*—Robert F. Kempf; John R. Manning

[57] ABSTRACT

Tones and binary information are transmitted as phase variations on a carrier wave of constant amplitude and frequency. The carrier and tones are applied to a balanced modulator for deriving an output signal including only a pair of sidebands relative to the carrier, which has a predetermined phase. The carrier is phase modulated by a digital signal so that it is ± 90° out of phase with the predetermined phase of the carrier. The carrier, in unmodulated form at the predetermined phase, is combined in an algebraic summing device with the phase modulated signal and the balanced modulator output signal. The output of the algebraic summing device is hard limited to derive a constant amplitude and frequency signal having very narrow bandwidth requirements. At a receiver, the tones and binary data are detected with a phase locked loop having a voltage controlled oscillator driving a pair of orthogonal detection channels.

11 Claims, 3 Drawing Figures

MODULATOR FOR TONE AND BINARY SIGNALS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF INVENTION

The present invention relates generally to communication systems, and more particularly to a communication system wherein tone signals and binary signals are phase modulated on a constant frequency carrier that is transmitted as a wave of constant amplitude.

BACKGROUND OF THE INVENTION

In certain applications, it is desirable to transmit a composite signal containing binary information, as well as constant frequency and amplitude tones which are susceptible to phase variations. The binary signal may contain information regarding the state of certain indicators or the value of certain transducers, while the variable phase tone can be employed for distance determinations. Such a system is disclosed, e.g., by U.S. Pat. No. 3,534,367 to Laughlin et al. It is desirable for the composite signal to occupy a minimum bandwidth, with the optimum being achieved by providing a signal that requires a bandwidth no greater than the bandwidth necessary for a single frequency. Prior art systems for transmitting tones and binary information on a composite signal have not approached the optimum bandwidth situation, but have generally required separate sub-carriers for the individual signals. The use of individual sub-carriers has the further disadvantage of requiring filters in a receiver to enable separation and detection of the tones and binary signals.

BRIEF DESCRIPTION OF THE INVENTION

In accordance with the present invention, variable phase tones and binary signals are modulated on a carrier requiring minimum bandwidth, approaching the optimum. Variable phase tones, which may be indicative of range as disclosed in the Laughlin et al patent, are balance modulated onto an in-phase ($\sin \omega_o t$) component of a reference carrier, while the binary data is phase reversal ($\pm 90°$) modulated onto a quadrature ($\cos \omega_o t$) component of the reference carrier. The two modulated signals are linearly combined with a residual, unmodulated carrier ($\sin \omega_o t$). The resulting composite signal is hard limited to derive a constant amplitude envelope that has phase variations indicative of the binary signal and the tone phase. Because the composite signal has constant amplitude and constant identical carrier frequency components, the bandwidth required for the variable phase information is relatively narrow.

A receiving station responds to the variable phase signal and separates the variable phase tones and the binary signals without the use of filters. To this end, a receiver responsive to the composite signal includes a pair of orthogonal channels driven by a single phase locked loop. In one channel, 180° phase shifts are derived to indicate the value of the binary signal, while in the other channel variable phase tones are derived as replicas of the variable phase tones at the transmitter.

It is, accordingly, an object of the present invention to provide a new and improved system for transmitting a composite signal including variable phase tones and binary signals.

Another object of the invention is to provide a communication system having minimum bandwidth, approaching the bandwidth required for a signal having a single frequency, for transmission of a composite signal including binary signals and variable phase tones.

An additional object of the invention is to provide a new and improved communication system wherein a variable phase tone and a binary signal are transmitted as a composite signal to a receiver which does not require filters to separate the tone and binary signals.

A further object of the invention is to provide a new and improved communication system wherein binary signals and variable phase tones are transmitted as phase variations on a signal having constant amplitude and very narrow bandwidth requirements.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
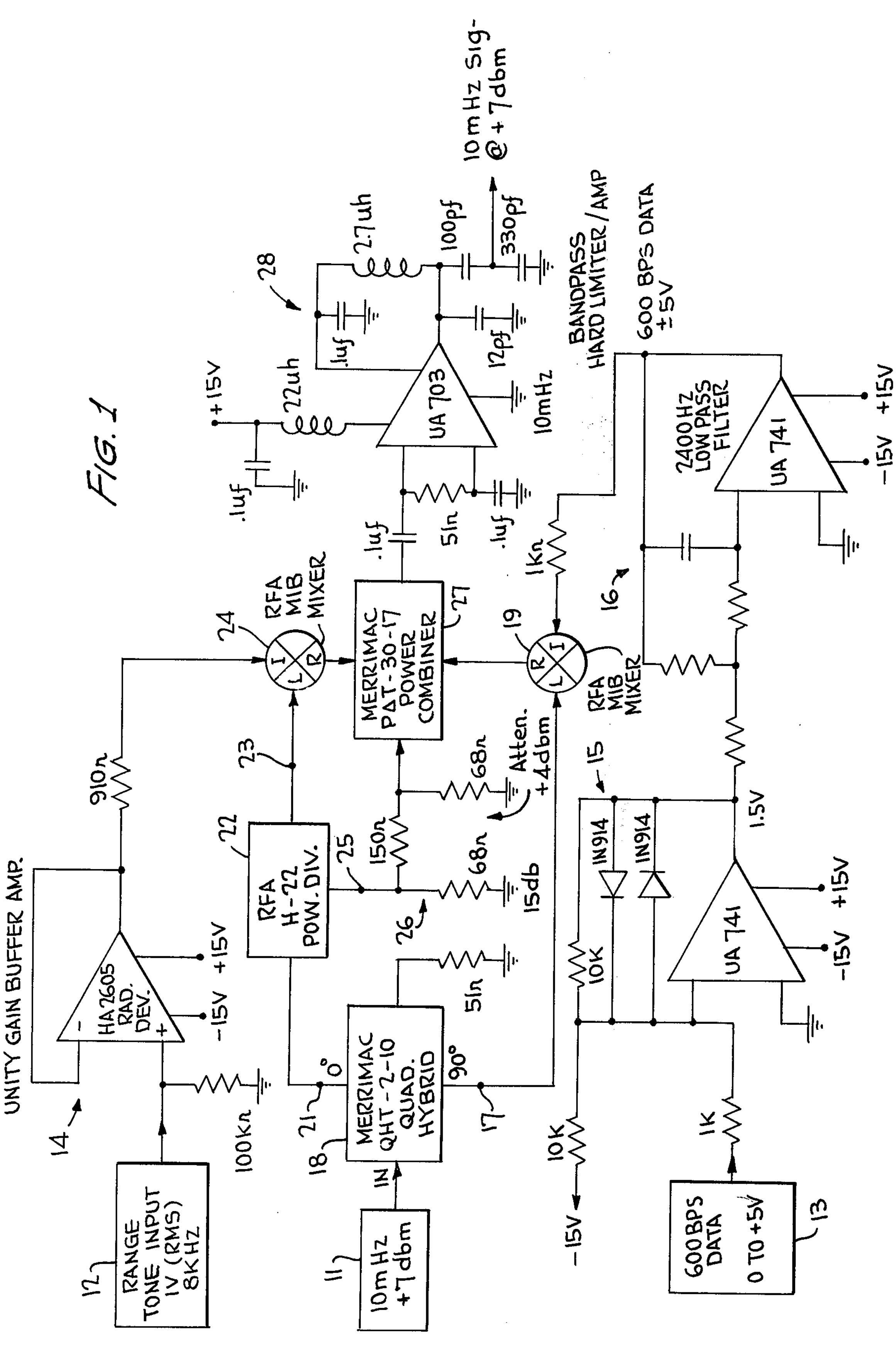
FIG. 1 is a circuit diagram of a preferred embodiment of the modulator in accordance with the present invention.

Reference is now made to FIG. 1 of the drawing wherein there is illustrated a source 11 of relatively high power reference frequency which serves as a carrier of reference phase for modulating sources 12 and 13. Source 12 is a sinusoidal tone of variable phase having constant amplitude and constant carrier frequency, while source 13 is a binary signal having excursions from 0 to a +d.c. level. Typically, the frequencies of sources 11 and 12 are respectively 10 MHz and 8 KHz, while the bit rate of source 13 is 600 bits per second. The variable phase of source 12 typically is indicative of the range between a remote receiving station and a transmitter for a composite signal derived by the present invention.

Binary data source 13 typically has values indicative of measured parameters at the transmitter location, with examples of such parameters being an output derived from an accelerometer or an indicated air speed gauge. The output of source 12 is fed through a unity gain buffer amplifier 14 which derives an output signal that is a one-to-one replica of its input, while the output of source 13 is fed through an amplifying and limiting circuit 15 to an active low pass filter 16 having components selected to provide a cutoff frequency of 2,400 Hz. The gains of circuits 15 and 16, as well as the filter characteristics of circuit 16, are selected whereby the output of filter 16 is a binary signal having an average value of zero with ±5 volt excursions respectively indicative of binary 1 and 0 values. The 600 bit per second data rate of source 13 is preserved at the output of filter 16.

Mathematically, the signals derived from source 11, amplifier 14 and filter 16 can be respectively represented as:

$$f(t) \quad (1),$$

$$\sin \omega_0 t \quad (2),$$

and $$U(nT) = \{^1_0 \; n = 1, 2, \ldots \infty \quad (3)$$

The signal derived from filter 16 is combined with a 90° phase shifted replica of the signal derived from source 11, as derived from output terminal 17 of hybrid 18, in balanced mixer 19. The balanced mixer thereby derives an output represented as:

$$\sqrt{2}A_2 \cos(\omega_0 t + \theta(nT)) \quad (4),$$

where:

$\theta(nT) = \pi$ radians for a value of zero for the binary signal source 13.

$\theta(nT) = 0$ radians for a value of one for the binary signal source 13.

The output of mixer 19 is thereby an a.c. signal having constant amplitude and constant carrier frequency with phase variations $\theta(nT)$ indicative of the binary value of signal source 13. In the alternative, the output of mixer 19 can be expressed as:

$$\sqrt{2}A_2 B \cos \omega_0 t \quad (5),$$

where:

$B = +1$ for $U(nT) = 1$, and $B = -1$ for $U(nT) = 0$.

The output signals of sources 11 and 12 are combined to derive sum and difference frequencies in accordance with:

$$\sqrt{2}A_1 f(t) \sin \omega_0 t \quad (6).$$

To this end, the output signal of source 11 is derived from output terminal 21 of hybrid 18 with the same phase as the signal of source 11. The signal at terminal 21 is applied to power divider 22, having an output terminal 23 at which there is derived a signal that is in phase with the reference phase of source 11. The signal at terminal 23 is combined with the output of amplifier 14 in balanced modulator 24, which derives an output signal in accordance with:

$$\sqrt{2}A_1 f(t) \cos \omega_0 t \quad (7).$$

It is important that a balanced modulator be utilized to combine the signal at terminal 23 with the output signal of amplifier 14 to prevent the derivation of a relatively large fixed signal component having the same frequency as source 11 and phase shifted from the source by 90°. Such a signal component would materially reduce the possibility of recovering, at a receiver, the phase modulated signal component derived from mixer 19.

In order to recover the phase modulated signals derived from mixers 19 and 24, it is necessary to provide a carrier ( $\sqrt{2}A_3 \sin \omega_0 t$) having the same frequency and phase as the signal at terminal 21. To this end, power divider 22 is provided with a further output terminal 25 which drives 15 db attenuator 26 so as to provide a desired amplitude relationship between the two phase modulated signals and the carrier derived from the attenuator. The output signals of mixers 19 and 24 and attenuator 26 are linearly combined in power combiner 27 which derives an output signal represented by:

$$\sqrt{2}A_1 f(t) \sin \omega_0 t + \sqrt{2}A_3 \sin \omega_0 t + \sqrt{2}A_2 B \cos \omega_0 t \quad (8).$$

To eliminate the variable amplitude components on the output signal of power combiner 27, the signal is fed to a hard limiter 28 that preferably comprises a high gain amplifier having filtering circuits with a bandpass centered at 10 MHz, the carrier frequency of source 11. Limiter amplifier 28 derives an output signal having constant amplitude and constant carrier frequency, but with variable phase indicative of the phase of source 12 and binary value of source 13. Mathematically, the output signal of limiter amplifier 28 is represented as:

$$\sqrt{2}D \cos[\omega_0 t + \theta(nT) + \phi(t)] \quad (9),$$

where:

$\tan \phi(t) = A_1 f(t) + A_3/A_2$

The output signal of amplifier 28 or a frequency translated replica thereof is transmitted via a narrow band link to a remote location where a demodulator is provided to separate the digital phase modulation from the tone phase modulation.

Figure 2:
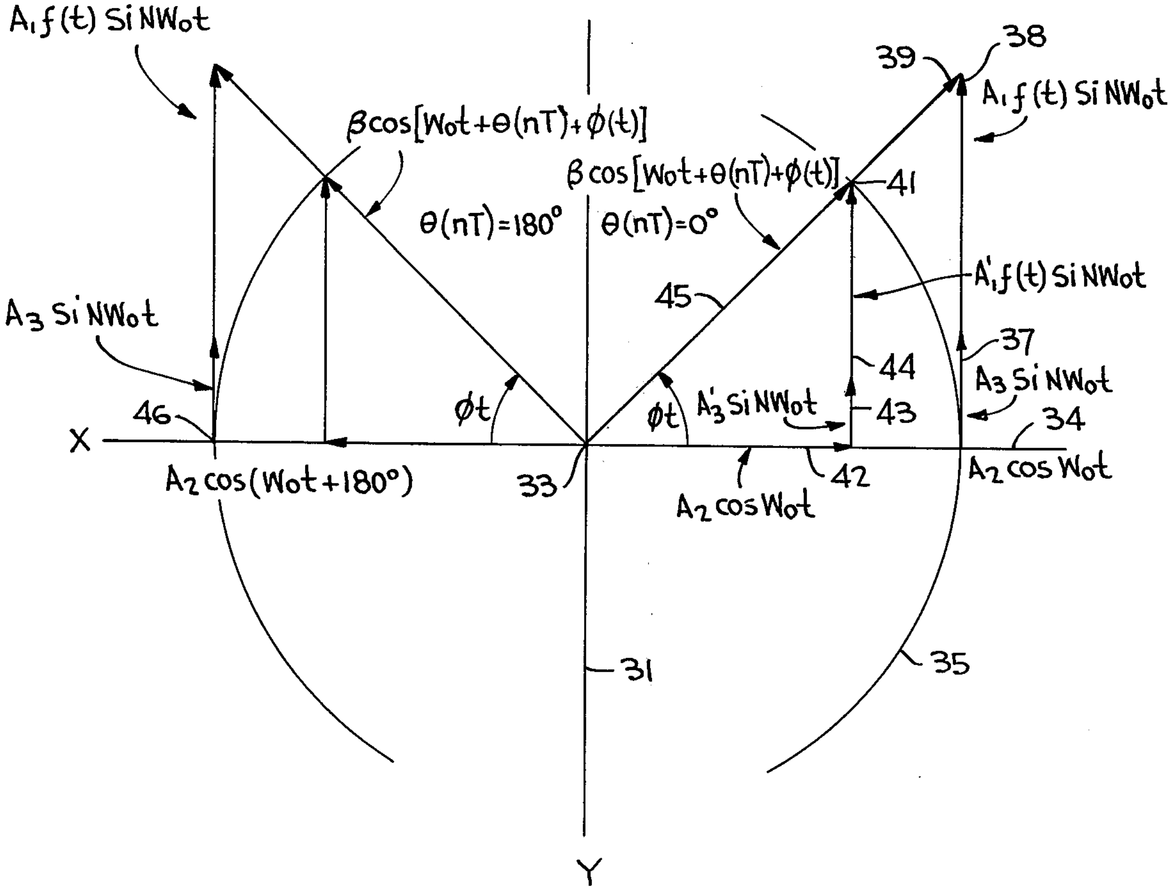
FIG. 2 is a vector diagram helpful in illustrating the operation of the system of FIG. 1.

To provide a more complete understanding as to the manner in which the modulator of the present invention functions, reference is now made to the vector diagram of FIG. 2. Two different conditions are illustrated in the vector diagram; all of the vectors to the right of Y axis 31 are based upon the assumption that binary source 13 has a value of one, while all vectors to the left of Y axis are derived by assuming a binary value of zero for source 13.

In response to a binary value of one, the output signal of mixer 19 ( $\sqrt{2}A_2 \cos \omega_0 t$) is represented by a vector 32 that extends from origin 33 along the X axis 34 to perimeter 35 of a unit circle. The unmodulated carrier derived from attenuator 26 ( $\sqrt{2}A_3 \sin \omega_0 t$) is represented by vector 37 that is at right angles to vector 32 and extends parallel to Y axis 36 upwardly from the end point of vector 32. The tone modulated ( $\sqrt{2}A_1 f(t) \cos \omega_0 t$) carrier derived from mixer 24 is represented by a further vector 38 that extends parallel to Y axis 31 upwardly from the end of vector 37, where it originates. Vector 38 actually translates vertically in both directions about the tip of vector 37 at a frequency equal to the frequency of source 12, but can be represented as illustrated for one particular value of the tone of source 12. The total length of vectors 37 and 38 is represented as:

$$\sqrt{2}A_1 f(t) + \sqrt{2}A_3$$

while the length of vector 32 is given as $\sqrt{2}A_2$. Summing vectors 32, 37 and 38 provides a vector 39 that represents the output of power combiner 27 and subtends an angle $\phi(t) = \tan^{-1} A_1 f(t) + A_3/A_2$ relative to X axis 34. Vector 39 rotates about origin 31 as a function of time during each cycle of carrier 11 and varies in amplitude as $f(t)$ changes and therefore represents a variable amplitude sinusoidal signal during each cycle of the carrier. Limiter 28 normalizes the amplitude variations of vector 39 so that amplitude variations due to the signals derived from mixer 24 and attenuator 26 are eliminated and a constant amplitude a.c. signal, represented by the unit circle 35 is derived. By limiting the amplitude variations to a unit circle, the phase of the composite signal is essentially preserved, whereby the vector 39 is shortened to the vector 41, with corresponding shortening of the lengths of vectors 32, 37 and 38. Thereby, vectors 32, 37 and 38 are respectively translated into vectors represented by:

$A'_2 \cos \omega_0 t$, $A'_3 \cos \omega_0 t$, and $A'_1 f(t) \sin \omega_0 t$.

The translation of vectors 32, 37 and 38 into vectors 42, 43 and 44 provides a resultant vector 45 having the same phase angle as vector 39.

In response to signal source 13 having a binary value of zero, the output of mixer 19 is represented by a vector 46 that extends along X axis 34 in a negative direction from Y axis 31. The components derived from attenuator 26 and mixer 24 extend upwardly from X axis 34 in the same manner as described previously for the situation wherein it is assumed that the binary value of source 13 is one. Thereby, the same basic operations are provided in response to a binary zero value being derived by source 13, except with regard to a shift in the orientation of the phase angle $\phi(t)$ relative to X axis 34.

Figure 3:
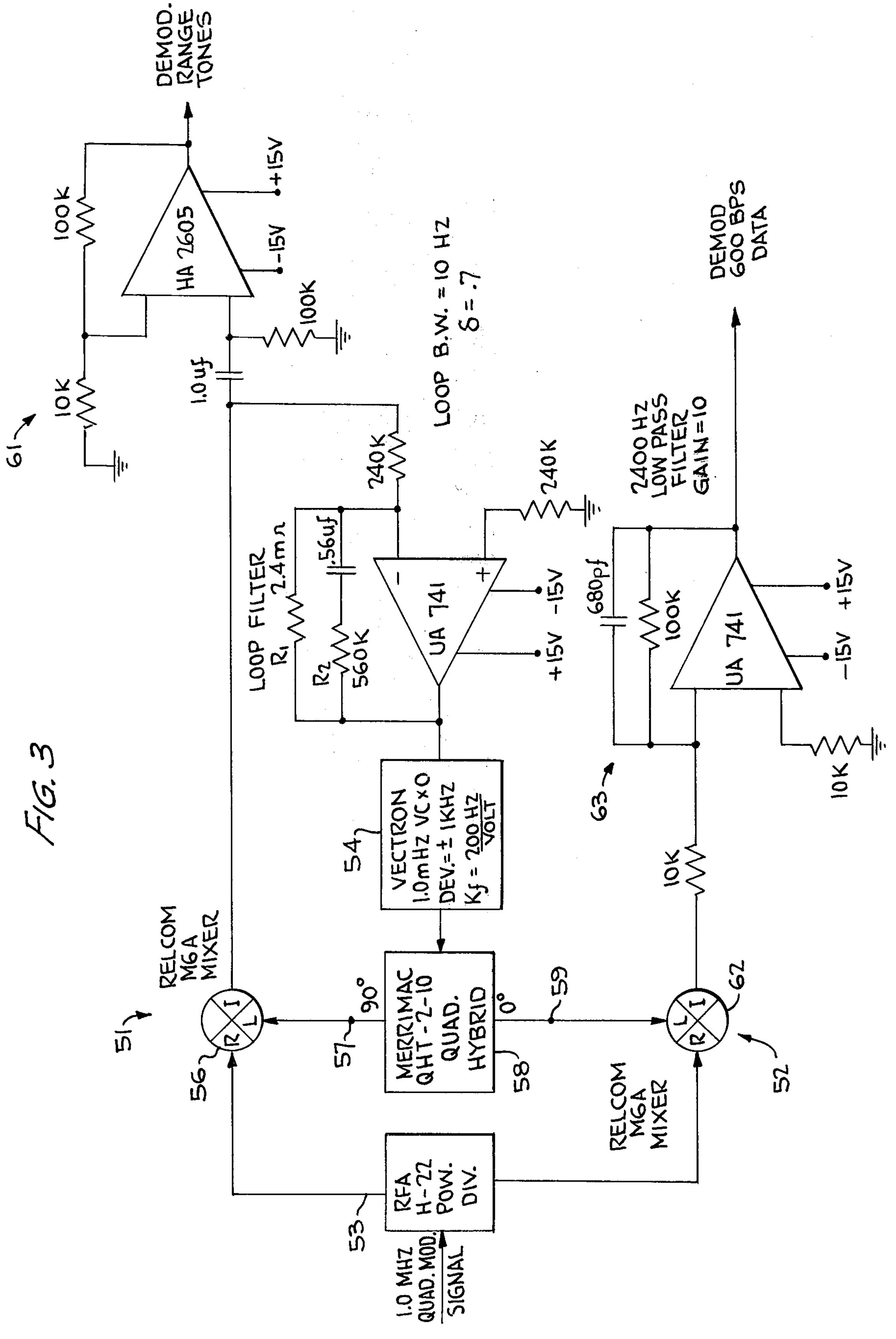
FIG. 3 is a circuit diagram of a preferred embodiment of a receiver for the signal derived by the modulator of FIG. 1.

Reference is now made to FIG. 3 of the drawing wherein there is illustrated a preferred embodiment of detector circuitry responsive to a replica of the phase modulated wave derived from the modulator of FIG. 1. The phase of the signal supplied to the detector circuitry of FIG. 3 is preserved, although the carrier frequency may be shifted by well known frequency translating circuitry. Basically, the circuit of FIG. 3 includes a pair of orthogonal detector channels 51 and 52 for deriving replicas of the signals derived from sources 12 and 13. Channels 51 and 52 are driven in parallel by signals having identical frequency, amplitude and phase, as derived from power divider 53.

Channel 51 is an imperfect second order phase locked detector loop, as generally described on page 21 of *Principles of Coherent Communication*, (Viterbi), Copyright 1966, by McGraw-Hill. The phase locked detector loop includes a voltage controlled, variable frequency crystal oscillator 54 driven by a d.c. signal derived from loop filter 55 and having a center frequency equal to the frequency of the variable phase output signal of power divider 53. Filter 55 is preferably an active filter including an amplifier having feedback and input circuitry to provide a transfer function $$F(s) = s + a/s + \epsilon$$

where:

$s$ = La Place operator $a = 1/R_2C$ and $\epsilon = 1/(R_1+R_2)C$.

Filter 55 is driven by a lower sideband derived from mixer 56, which non-linearly combines signals derived from an output of power divider 53 and an output at terminal 57 of hybrid 58. Hybrid 58 is driven by the variable frequency output of voltage controlled oscillator 54 and includes a pair of output terminals 57 and 59, at which are respectively derived voltages that are 90° out of phase and in phase with the output voltage of the voltage controlled oscillator. The phase locked loop comprising oscillator 54, filter 55, hybrid 58 and mixer 56 is arranged so that it has a bandwidth of approximately 10 Hz and a Q of approximately 0.7.

The lower sideband derived from mixer 56 is a replica of the variable phase signal derived from source 12. The lower sideband is applied to a.c. amplifier 61 which derives an output that is fed to any suitable phase detector for recovery of the phase information derived from source 12. A preferred form of the phase detector is described in the copending application entitled "Correlation Type Phase Detector", commonly assigned with the present invention and designated by NASA Case 11,744-1.

To recover the binary modulation imposed by source 13 on the signal derived by the modulator of FIG. 1, channel 52 includes a mixer 62 which non-linearly combines signals derived from the 0° phase output of hybrid 58, at terminal 59, and the signal derived from power divider 53. Modulator 62 derives a lower sideband that is fed to an active low pass filter 63 having a high frequency cutoff of 2400 Hz and a gain of 10. The output of low pass filter 63 is a binary signal having positive and negative variations about a zero average value and is a replica of the signal derived from source 13.

While there has been described and illustrated one specific embodiment of the invention, it will be clear that variations in the details of the embodiment specifically illustrated and described may be made without departing from the true spirit and scope of the invention as defined in the appended claims. For example, the component values and component types specifically illustrated on the drawing for the particularly disclosed embodiment are exemplary of a preferred embodiment. Other devices and component values may be used according to particular design requirements.

What is claimed is:

1. A modulator for a sinusoidal tone signal $[f(t)]$ of variable phase and a binary signal comprising means for providing a carrier signal $\sin \omega_0 t$, and means responsive to the carrier signal, the tone signal and the binary signal for deriving a composite a.c. signal of constant amplitude, constant carrier frequency and a variable phase represented by:

$$\theta(nT) + \phi(t),$$

where:

$t$ = time, $\theta(nT) = 0$ for a first value of the binary signal, $\theta(nT) = \pi$ for a second value of the binary signal, $\tan \phi(t) = A_1 f(t) + A_3/A_2$, and $A_1$, $A_2$ and $A_3$ are constants having finite, non-zero values.

2. The modulator of claim 1 wherein said means for deriving includes means for deriving the composite signal as a signal proportional to:

$$\cos [\omega_0 t + \theta(nT) + \phi(t)].$$

3. The modulator of claim 1 wherein said means for deriving includes means for deriving a variable amplitude a.c. signal proportional to:

$$A_1 f(t) \sin \omega_0 t + A_3 \sin \omega_0 t + A_2 \cos [\omega_0 t + \theta(nT)],$$

and means for limiting the variable amplitude signal.

4. A device for modulating a variable phase sinusoidal tone signal and a binary signal on a constant frequency carrier signal comprising a balanced modulator responsive to the carrier and tone signals, said carrier being derived from the balanced modulator with reference phase, means for shifting the carrier from the reference phase by ±90° in response to the amplitude of the binary signal, and means for linearly combining: (a) the carrier signal with reference phase, (b) the phase shifted carrier and (c) the balanced modulator output to derive a composite signal.

5. The device of claim 4 further including limiting means responsive to the composite signal for deriving an a.c. signal of constant amplitude and frequency.

6. The device of claim 4 wherein said means for combining derives a variable amplitude a.c. signal proportional to:

$$A_1 f(t) \sin \omega_o t + A_3 \sin \omega_o t + A_2 \cos [\omega_o t + \theta(nT)]$$

where:

$A_1$, $A_2$ and $A_3$ are constants having finite, non-zero values, $\omega_o = 2\pi f_o$ $f_o$ = carrier frequency $t$ = time $\theta(nT) = 0$ for a first value of the binary signal $\theta(nT) = \pi$ for a second value of the binary signal 7. The device of claim 6 further including limiting means responsive to the composite signal for deriving an a.c. signal of constant amplitude and constant carrier frequency.

8. The device of claim 7 wherein the constant amplitude and constant carrier frequency signal is represented as:

$$\cos [\omega_o t + \theta(nT) + \phi(t)],$$

where:

$\tan \phi(t) = A_1 f(t) + A_3/A_2$.

9. A communications system for a sinusoidal tone signal $[f(t)]$ of variable phase and a binary signal comprising a source of carrier signal, $\sin \omega_o t$, modulator means responsive to said signals for deriving a composite a.c. signal of constant amplitude that is represented by:

$$\cos [\omega_o t + \theta(nT) + \phi(t)],$$

where:

$\theta(nT) = 0$ for a first value of the binary signal, $\theta(nT) = \pi$ for a second value of the binary signal, $\tan \phi(t) = A_1 f(t) + A_3/A_2$, and $A_1$, $A_2$, and $A_3$ are constants having finite, non-zero values, and means responsive to a replica of the composite phase modulated separating the tone and binary signal components phase modulated on the composite signal.

10. The system of claim 9 wherein said means for separating includes a pair of orthogonal demodulator channels.

11. The system of claim 10 wherein one of channels includes a phase locked demodulator loop for deriving a wave having a frequency and phase responsive to the replica of the composite signal, means for non-linearly combining said wave and the signal replica in one of said channels, and means for non-linearly combining a 90° phase shifted replica of said wave and the signal replica in the other channel.

* * * * *

UNITED STATES PATENT AND TRADEMARK OFFICE

CERTIFICATE OF CORRECTION

PATENT NO. : 3,878,464

DATED : April 15, 1975

INVENTOR(S) : James C. Fletcher Et Al

It is certified that error appears in the above-identified patent and that said Letters Patent are hereby corrected as shown below:

Column 4, in each of lines 16 and 54, that portion of the equation reading "$A_1f(t)+A_3/A_2$" should read-- $\frac{A_1f(t)+A_3}{A_2}$ --.

In each of claim 1, line 13, claim 8, line 6 and claim 9, line 10 that portion of the equation reading "$A_1f(t)+A_3/A_2$ should read-- $\frac{A_1f(t)+A_3}{A_2}$ --. Claim 9, lines 13 and 14, the expression reading "phase modulated" should read--signal for--.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*